Sept. 2, 1941.   H. E. WICKETT   2,254,923
HAY RETAINER FOR STACKERS
Filed Oct. 21, 1939

INVENTOR.
HERBERT E. WICKETT
BY HIS ATTORNEYS.
Williamson & Williamson

Patented Sept. 2, 1941

2,254,923

UNITED STATES PATENT OFFICE 2,254,923

HAY RETAINER FOR STACKERS

Herbert E. Wickett, Canton, Minn.

Application October 21, 1939, Serial No. 300,668

1 Claim. (Cl. 214—144)

This invention relates to hay retainers for hay stackers.

When stacking hay with a conventional type of hay stacker it is frequently difficult to keep the hay on the stacker rake tines particularly in the case of that type of stacker commonly known as an overshot stacker. Numerous types of hay retainers have been devised for mounting on the rake tines but they are of such construction that they will catch and accumulate quantities of hay which will interfere with their proper function. Some of these also have the disadvantage of requiring different tine structures and are too complicated to function properly in work of this type.

One of the objects of my invention is to provide a hay retainer for stacker tines which is of extremely simple structure and which will function successfully and stand up under the relatively large weights imposed upon it.

Another object of the invention is to provide a hay retainer having a vertically movable portion wherein said retainer is formed in one piece and can be easily and rigidly secured to the tine.

These and other objects and advantages of the invention will more fully appear from the following description made in connection with the accompanying drawing, wherein like reference characters refer to the same parts throughout the views, and, in which.

Figure 1:
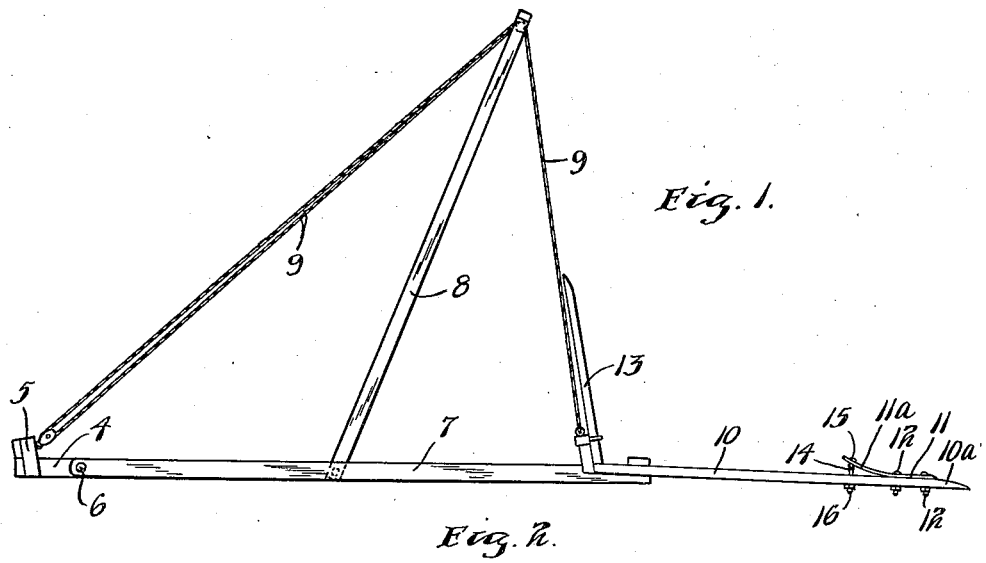
Fig. 1 is a very general showing of an overshot hay stacker in side elevation with my invention secured thereon.
Figure 2:
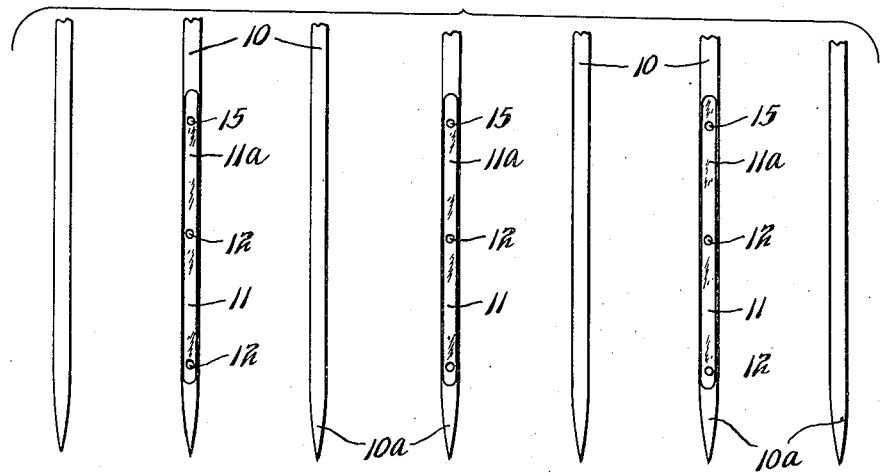
Fig. 2 is a plan view of a plurality of stacker tines showing my improved retainer on three of said tines.

In Fig. 1 there is shown the essential elements of an overshot stacker comprising a side frame member 4 and a rear cross member 5. Pivotally mounted at 6 on the side member 4 is one of a pair of movable elements 7 whose forward end is connected to the tine assembly. A pivoted upright 8 is pivotally connected to each of the side frame members 4 and connected at its upper end to a block and tackle arrangement including a cable or rope 9 which is also secured to the rear cross member 5. The tine assembly is adapted to swing to the left as viewed in Fig. 1 and upwardly to deposit hay from the tines onto the stack.

The tines 10 are forwardly extending elongated teeth usually formed of wood and having pointed and tapered ends 10a. From points immediately in back of the pointed ends the tines are generally flat on top and when the hay is pushed upon the group of tines it sometimes does not remain thereon and portions of the rake full of hay will fall off the forward ends of the tines.

Figure 3:
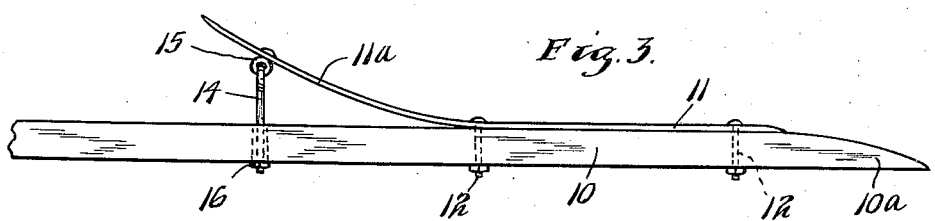
Fig. 3 is a side elevation of a tine with my hay retainer thereon.

To properly retain the hay on the group of tines I provide a plurality of spring metal retainer elements 11, the forward portions of which are straight and flat and lie against the flat top surface of the tines to which they are secured by nutted bolts 12. The rear portions 11a of the retainers 11 are curved upwardly and rearwardly preferably with a relatively gradual curve and the normal shape of the retainer with its curved rear end is as shown in Figs. 1 and 3. Thus when a load of hay is pushed upon the tine assembly the weight of the load will press the upwardly curved retainer ends 11a down against the tops of the tines to which they are secured or nearly flat against said tine tops. After the load of hay has been pushed back against the rear uprights 13 shown in Fig. 1 most of the weight of the load of hay will have passed rearwardly of the retainers and the curved ends 11a will spring back to the position illustrated in the drawing due to their natural resilience.

In order to assist in guiding the curved retainer ends 11a in a proper vertical plane and to prevent said curved ends from springing upwardly or being forced upwardly by accident a distance greater than desired, I provide a movement limiting element in the form of a relatively long bolt 14 which has its upper end pivotally secured in a metal eye 15 adjacent the end of the curved rear portion 11a. The bolt 14 extends downwardly through a hole in the tine and is freely slidable therein. A nut 16 on the end of the bolt 14 beneath the tine limits the upward sliding movement of said bolt.

My improved hay retainer structure, as will be seen, is formed entirely of a single piece of relatively smooth flat metal with a gradually curved rear end portion. The only relatively movable parts are the rear end of the retainer where it is curved upwardly and the movement limiting bolt 14. There is nothing in my structure to catch any material amount of the hay as it is passed rearwardly over the tines and the retainer, and even should a small amount be caught beneath the upwardly curved end it will in no way affect proper functioning of the device. The retainer should be made relatively strong with considerable resistance to downward bending of the rear end so that said rear end will spring upwardly after most of the load has passed over it. It is very strongly mounted upon the tine to which it is secured and a one piece resilient retainer of this type will function properly for an indefinite length of time. It should give satisfactory service without attention or repair for the full life of the group of tines with which it is used.

It will, of course, be understood that various changes may be made in the form, details, arrangement and proportions of the various parts without departing from the scope of my invention.

What is claimed is:

A hay retainer for hay stackers comprising an elongated resilient metal element having a forward relatively straight portion adapted to lie flat on a stacker rake tine, said element having a rear portion extending upwardly and rearwardly and terminating above the horizontal longitudinal line of said forward straight portion, said rear portion being downwardly yieldable under imposed weights to a position in substantially horizontal alignment with said forward portion, a bolt connected to the rear portion of said metal element and adapted to extend through a stacker tine for limited vertical movement with respect to the tine.

HERBERT E. WICKETT.